Aug. 9, 1960 H. B. SEDGFIELD 2,948,157
GYROSCOPICALLY STABILIZED PLATFORMS
Filed May 12, 1951 5 Sheets-Sheet 1

INVENTOR
HUGH B. SEDGFIELD
BY
Herbert H. Thompson
HIS ATTORNEY

Aug. 9, 1960    H. B. SEDGFIELD    2,948,157
GYROSCOPICALLY STABILIZED PLATFORMS
Filed May 12, 1951    5 Sheets-Sheet 2

INVENTOR
HUGH B. SEDGFIELD
BY
Herbert H. Thompson
HIS ATTORNEY

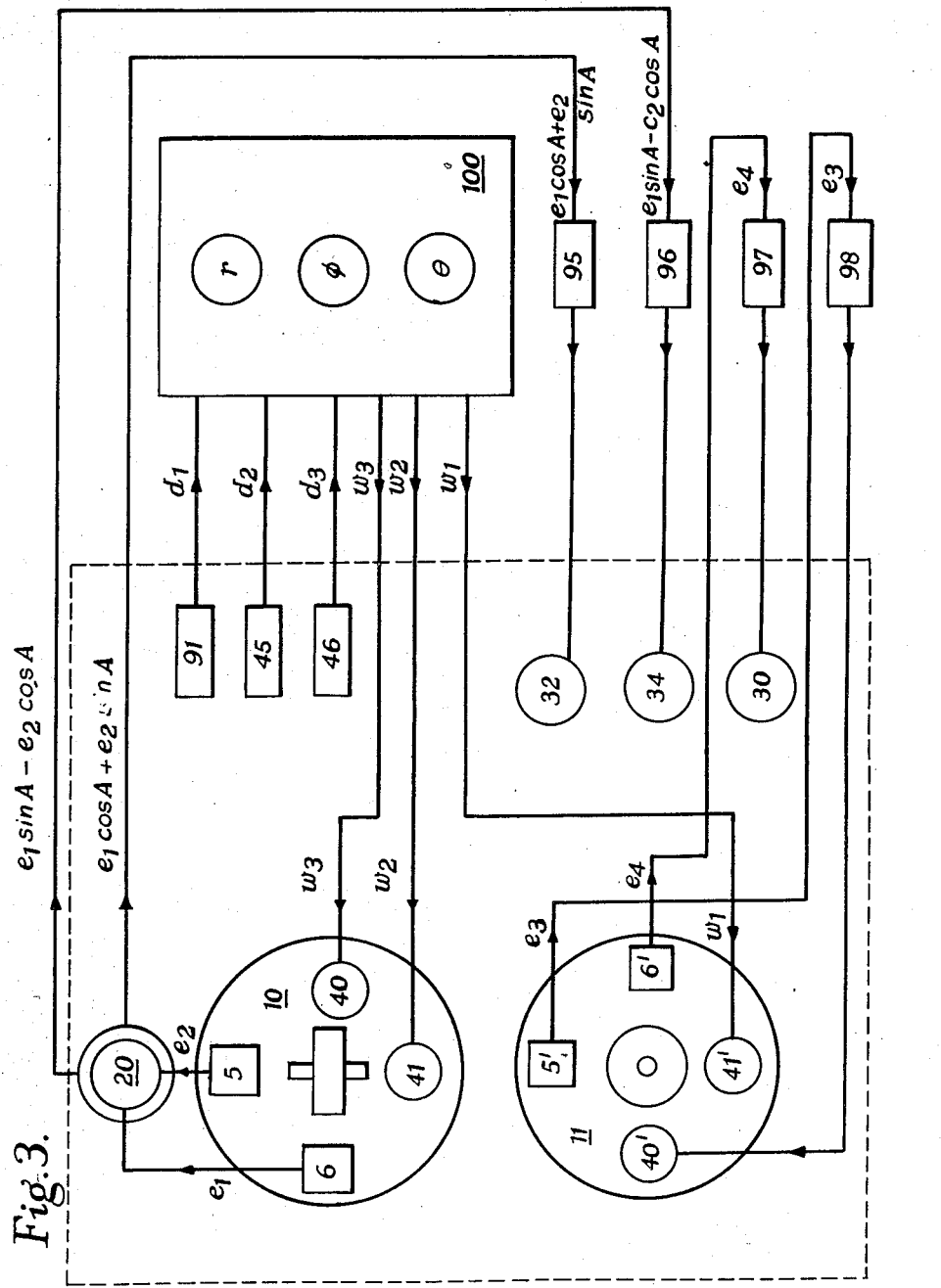

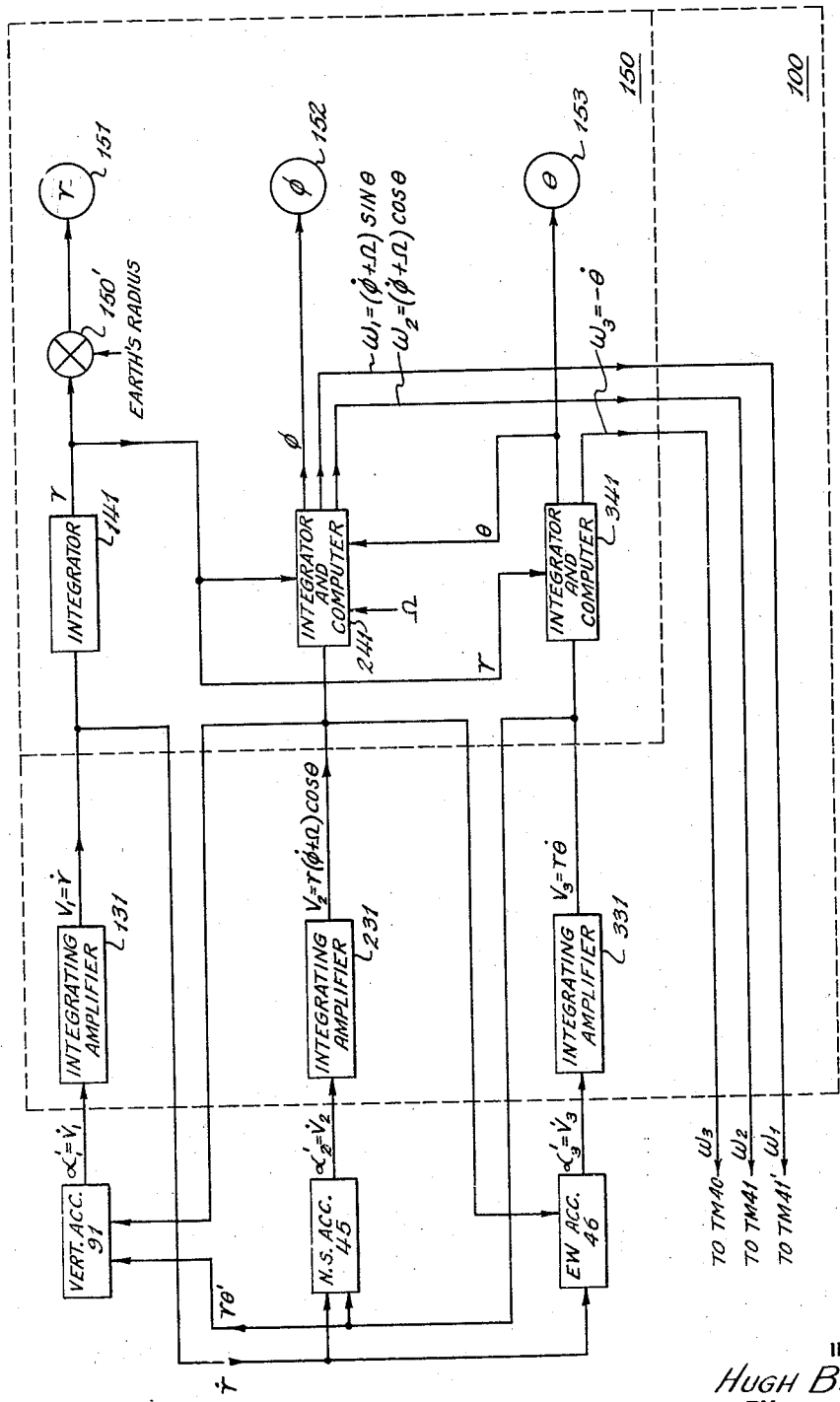

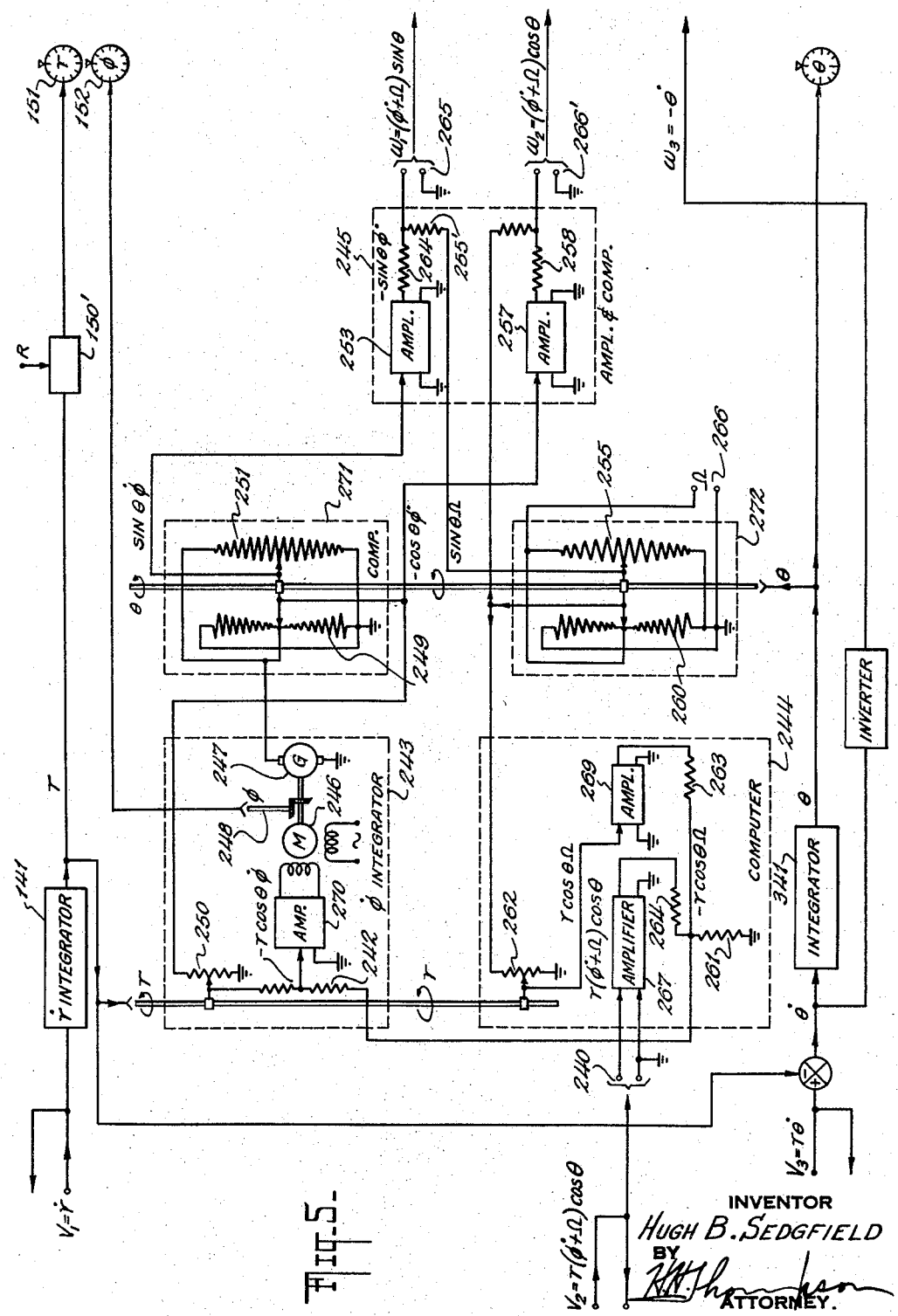

United States Patent Office 2,948,157
Patented Aug. 9, 1960

2,948,157

GYROSCOPICALLY STABILIZED PLATFORMS

Hugh Brougham Sedgfield, Hampton, England, assignor, by mesne assignments, to The Sperry Gyroscope Company, Limited, Brentford, England, a British company Filed May 12, 1951, Ser. No. 225,937

Claims priority, application Great Britain May 16, 1950

9 Claims. (Cl. 74—5.34)

This invention relates to gyroscopic instruments for maintaining a vertical reference on a moving craft. A considerable number of gyroscopic instruments have been proposed for defining a vertical on an unstable platform such as a ship. In general, these employed gravity-responsive devices such as pendulums or accelerometers which, when the craft or platform was stationary, exercised control of one or more gyroscopes to precess a reference line having a predetermined relationship to the gyroscope or gyroscopes towards alignment with the gravity vertical. Such control devices respond also to lateral accelerations of the craft on which the instrument is carried. In consequence, when the craft was subjected to an acceleration, the control device operated to precess the gyroscope into a direction inclined at an angle to its original true vertical position, giving rise to what were known as acceleration errors.

It is known, however, that these deflections caused by accelerations of the craft do not necessarily cause errors. When the craft accelerates it acquires a velocity, resulting in its travelling over the earth's surface. In so doing, it arrives at points where the local vertical makes an angle with the original true vertical position. If the response of the control device to the acceleration were such as to precess the spin axis of the gyroscope, or other reference line, in the correct direction and at the correct rate, the spin axis might continuously align itself correctly with the new vertical defined by the new position of the craft on the earth's surface. If this were to happen there would be no acceleration error.

It is known as a theoretical possibility that such a result would be achieved, in the case of a craft-moving in a great circle over a stationary, i.e., non-rotating, earth, by a gyroscopic system comprising the combination of a gyroscope whose spin axis is initially set in the plane of the great-circle, a pendulum or accelerometer mounted on the rotor case of the gyroscope and arranged to provide an output quantity measuring the horizontal acceleration of the craft in the plane of the great circle, an integrator adapted to receive and integrate the measure of acceleration, and torque-applying means adapted to apply to the gyroscope a torque proportional to the integral so obtained so as to cause the gyroscope to precess in the plane of the said great circle. At least this result might be obtained if all the parts operated accurately and if the actions took place always in the correct quantitative ratios to precess the gyroscope at the same rate as the rotation of the local vertical at the changing position of the craft on the earth's surface.

A gyroscopic system of this proposed type would maintain its spin axis at a constant angle to the local vertical only if it operated perfectly and if it were initially set correctly with respect to the true vertical. If it were initially incorrectly set it would execute an undamped oscillation about the changing local vertical having a period of 84 minutes i.e. a period equal to $2\pi \sqrt{R/g}$ where R is the radius of the earth and $g$ is the acceleration of gravity at the place where the craft is located. The system would thus consitute a realisation of an 84 minute pendulum.

A principle involved in the above-mentioned proposal is that of precessing a gyroscope or gyroscopes at such a rate that a reference line associated with it or them turns in space at a rate equal to a computed measure of the angular velocity in space of a radius vector from the centre of the earth to the craft, the said angular velocity resulting at least partly from the craft's velocity over the earth's surface. This principle may be referred to as "velocity precession" of a gyroscope, and a gyroscopic system employing it may be referred to as being "velocity precessed." In order to carry out the principle one or more torque-applying devices must be provided which must be energised in accordance with computed measures of one or more components of the said space angular velocity. In general, the computed measure of velocity is computed from data including measurements of acceleration.

The object of the present invention is to realise a practical velocity-precessed gyroscopic system serving to define a reference line constantly related to the local vertical at the position on the earth's surface where the craft is instantaneously located.

The invention consists in a gyroscopic system that serves to define a vertical reference on a travelling craft including means for correcting for the change in the direction of the vertical due to the travel of the craft over the earth's surface by precessing one or more of the gyroscopes of the gyroscopic system in dependence on a measure of the craft's speed over the earth's surface, in which the means for applying the precessional torques to the gyroscope or gyroscopes are carried on a platform supported in the craft with freedom of relative angular movement about three mutually perpendicular axes and controlled by a servo system so that a reference line in it is maintained in alignment with the vertical defined by the gyroscopic system.

Preferably the measure of the craft's speed is computed from data including measurements of acceleration and these measurements of acceleration may be derived from accelerometers carried on the platform. In one embodiment two accelerometers are provided measuring component accelerations of the craft in two directions, and means are provided for applying the precessional torques to precess the gyroscope or gyroscopes in two planes, whereby the system may be used on a craft not restricted to travel in a great circle path. The computers that derive computed measures of the craft's speed may employ in the computation corrections for the rotation of the axes in which the measures of acceleration are obtained.

In particular the gyroscopic system may comprise a first gyroscope having its spin axis substantially vertical during operation, and a second gyroscope having its spin axis substantially horizontal during operation. In that case a first reference line in the platform is maintained in alignment with the spin axis of the first gyroscope, and a second reference line in the platform is maintained in alignment with the spin axis of the second gyroscope.

In more detail there is provided according to one aspect of the present invention a gyroscopic system comprising: a first gyroscope having its spin axis substantially vertical during operation: a second or azimuth gyroscope having its spin axis during operation at a substantial angle, preferably one in the neighbourhood of 90°, to the vertical: a platform (hereinafter termed the horizontal platform) supported in the craft so that freedom of relative angular movement between the platform and the craft is provided about three mutually perpendicular axes, and subject to connections or controls that cause it to be primarily stabilised by the first gyroscope i.e., to be oriented so that a predetermined plane in it (hereinafter termed the plane of the platform) is maintained substantially normal to the spin axis of the first gyroscope, and to be secondarily stabilised by the second gyroscope, about the spin axis of the first gyroscope, i.e., to be oriented about the said spin axis so that a predetermined line in the plane of the platform is maintained substantially in the azimuth plane containing the axes of the two gyroscopes; an accelerometer device mounted on the said platform and providing an output quantity measuring the component of the craft's acceleration along a reference direction lying in the plane of the platform at a fixed angle to the azimuth direction of the second gyroscope; computing means, including an integrator, for deriving from data including the said measure of acceleration a computed measure of the correspondingly directed component of the angular velocity in space of the radius vector from the earth's centre to the changing position of the craft, viz., the component that lies in the azimuth plane containing the spin axis of the first gyroscope and the said reference direction, and torque-applying means oriented by the said horizontal platform and arranged to receive from the computer the computed measure of the component angular velocity and to apply a torque to the first gyroscope proportional to the said computed measure to produce precession of the said gyroscope in the azimuth plane of the said component angular velocity. Preferably the spin axis of the azimuth gyroscope is controlled to be maintained parallel to the plane of the platform.

In a preferred embodiment of the invention two accelerometer devices as aforesaid are mounted on the platform so as to be responsive to angular accelerations along two mutually perpendicular horizontal directions, and the measures of acceleration that they provide are applied to computers, each including an integrator, that compute, from data including these measures, computed measures of the correspondingly directed components of the angular velocity of the radius vector from the earth's centre to the changing position of the craft, and there are also provided two torque-applying devices, both oriented by the horizontal platform, and each arranged to receive one of the computed measures of the said component angular velocities and to apply a torque proportional thereto to produce precession of the first gyroscope in the corresponding azimuth plane.

In the accompanying drawings Fig. 1 is a part sectional elevation of a stabilised platform mounted in a gimbal ring constituting part of one embodiment of a gyroscopic system according to the invention.

Fig. 3 is a diagrammatic circuit diagram showing the interrelation of parts and the functional operation of a complete gyroscopic system incorporating a stabilised platform of the kind illustrated in Figs. 1 and 2, as applied to provide navigational information.

Figs. 4 and 5 are detailed diagrams of the computer portion of the diagram of Fig. 3.

Figure 1:
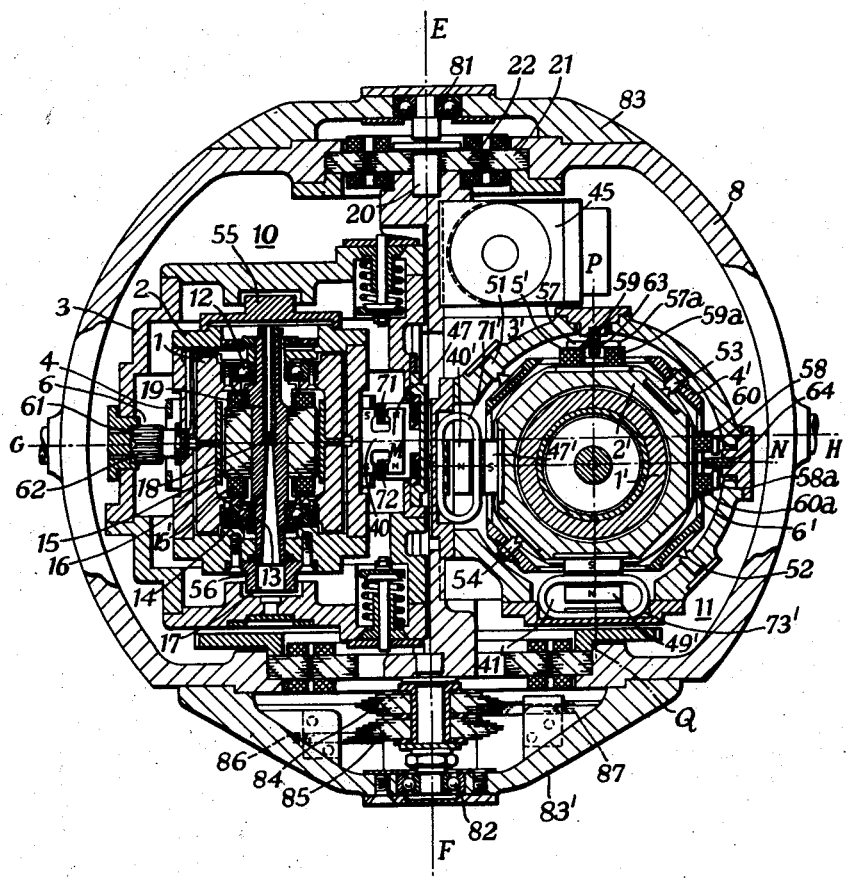
Figure 2:
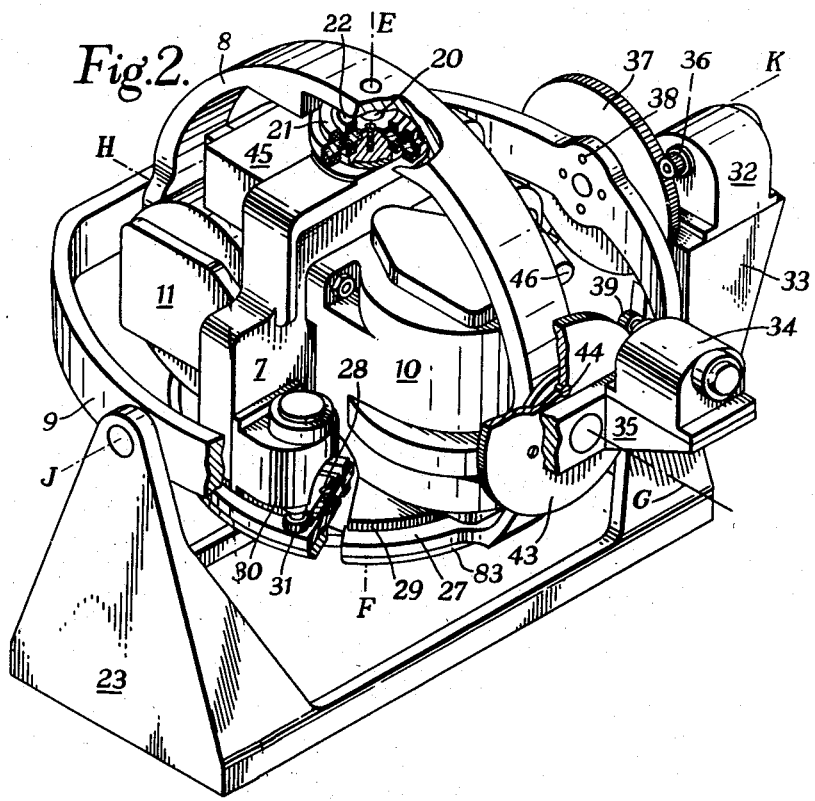
Fig. 2 is a diagrammatic representation of the stabilised platform shown in Fig. 1 mounted in a suitable gimbal-ring system.

Referring particularly to Figs. 1 and 2, two gyroscopes 10 and 11 are mounted on a single platform 7. Each of these gyroscopes is of the kind described in co-pending patent application No. 147,444 filed March 30, 1950 in the names of H. B. Sedgfield, J. A. Taylor and D. MacDougall and comprises an electrically driven rotor 1 (or 1') mounted for spinning in a rotor case 2 (or 2') which is in the form of a figure of revolution about a principal axis of symmetry (vertical in the case of gyroscope 10 as shown in Fig. 1 and horizontal and normal to the plane of the paper in the case of gyroscope 11). The rotor case 2 (or 2') is totally immersed in mercury, which buoyantly supports the weight of the rotor case and the contained rotor 1 (or 1'), the mercury being contained in and substantially filling a hollow float chamber 3 (or 3') rigidly fixed in or to the platform 7, the chambers 3, 3' and platform 7 constituting an enclosure assembly for the gyros 10 and 11. The rotor and the rotor case of each gyroscope are both made of the same material, which is a heavy metal such as a tungsten alloy. The rotor is hollow and is mounted for spinning about the principal axis of the rotor case in bearings 12 and 13, the inner races of which are fixed to a tube 14 fixed to the rotor case.

The rotor 1 (or 1') is electrically driven by means of an induction motor comprising a stator 15 and winding 15' in the interior of the hollow rotor mounted on the tube 14 and an eddy current ring 16 fixed to the rotor 1. Three-phase alternating current is fed to the stator winding 15' by means of leads 17 passing through the tube 14. One half of the tube 14 (the lower half in Fig. 1 in the case of gyroscope 10) is open to the float chamber, and mercury therefore enters and fills this half, but a rubber bung 18, held in place by a clamping screw 19, prevents it from entering the other half of the tube 14, which is open to the interior of the rotor case. In order to centralize the rotor case in the float chamber auxiliary supporting means are provided in the form of a universal joint having a pivot centre substantially coinciding with the centre of symmetry, and therefore of buoyancy, of the rotor case. These auxiliary supporting means consist of an auxiliary gimbal frame 4 (or 4') external to the rotor case 2 (or 2'), pivotally mounted in the float chamber in bearings 51 and 52, within which frame the rotor case 2 (or 2') is pivotally mounted in the bearings 53 and 54 about an axis perpendicular to the axis of the bearings 51, 52. Thus the rotor case is able to oscillate about any axis normal to the spin axis of the rotor. However, only a small amount of relative angular movement between the rotor case and the float chamber is required in operation and excessive movement is prevented by stops such as those shown at 55 and 56. Since the weight of the rotor and the rotor case is supported by the mercury, the bearings 51, 52, 53, 54, 55 and 56 are loaded by only small residual forces and may therefore be designed to be substantially frictionless.

Pick-off devices 5 and 6 in the case of gyroscope 10 and 5' and 6' in the case of gyroscope 11 are provided in the two float chambers. The pick-off device 5 is not visible in Fig. 1 of the drawings, but has the same relation to device 6 in gyroscope 10 as the pick-off device 5' has to device 6' in gyroscope 11 and the gyro 11 therefore may be termed a "directional gyro." The pick-off devices are arranged to detect, and provide output signals measuring, relative angular displacemnt, each about one axis normal to the spin axis of the rotor of the gyroscope, between the float chamber and the rotor case supported in it, the displacemnt being measured from a zero position in which the pick-off devices give zero output signals signifying correct alignment. The line in the float chamber with which the rotor axis of each gyroscope coincides when the rotor case is in correct alignment, as judged by the outputs from the two assoicated pick-off devices being both zero, defines a reference line which may be regarded as being a line in the platform 7. Arrangements, more fully described hereinafter, are provided for controlling the platform 7 in such a manner that the outputs of the pick-off devices are maintained substantially zero and, therefore, so that the reference lines defined by the lines in the two float chambers assume the same directions as the rotor axes of the two gyroscopes.

In operation the rotor axis of gyroscope 10 is initially set vertical and thereafter maintained substantially vertical by further control arrangements as described more fully hereinafter, and, therefore, the system operates to maintain the reference line defined by the line in float chamber 3, substantially vertical. This line is, therefore, hereinafter referred to as the "vertical reference line." Similarly, the rotor axis of gyroscope 11 is initially set horizontal and in the north-south direction and thereafter maintained substantially in the same direction by control arrangements and, therefore, the system operates to maintain the reference line defined by the line in float chamber 3', substantially horizontal and in the north-south direction. This line is, therefore, hereinafter referred to as the "horizontal north-south reference line."

Each of the pick-offs 5, 6, 5' and 6' comprises a primary element fixed to the rotor case, and a secondary element 63 (or 64) fixed to the float chamber. Each primary element consists of a core of magnetic material including pole pieces such as those shown at 57, 57a, 58 and 58a in gyroscope 11, facing each other across a substantial air gap. Mounted on this core are windings 59 and 59a (or 60 and 60a) which are energised by alternating current supplied over the same leads as the current for the induction motors driving the rotors 2 and 2'. Thus an alternating magnetic field is produced across the gap between the pole pieces 57 and 57a (or 58 and 58a). Each secondary element 63 (or 64) is situated in the gap between the pole pieces of the core, and carries two windings (such as those shown at 61 and 62 in gyroscope 10) having their axes side by side and directed along the direction of the magnetic flux between the pole pieces. These windings are connected to series opposition so that the E.M.F.'s induced in them by the alternating magnetic flux will oppose each other. When the two windings of the secondary element are symmetrically disposed with respect to the magnetic field, they provide zero output signals, and the axis of the rotor coincides with the reference line in the float chamber. When, however, the axis and the reference line do not coincide, the coils of the appropriate pick-off or pick-offs will no longer be symmetrically located with respect to the magnetic field and the E.M.F. induced in one of the windings will be greater than that induced in the other, with the result that the pick-off will provide an output signal measuring, by its magnitude and phase sense, the magnitude and sense of the departure from alignment of the said axis and reference line.

Two torque motors are provided in each gyroscope to enable torques to be applied to the gyroscope about each of two axes through the centre of suspension and buoyancy of the rotor case which are mutually perpendicular and also perpendicular to the rotor axis, to cause desired precessions of the gyroscope about the other of the said two axes. These axes may therefore be referred to either as the torque axes or as the precession axes. They are indicated in the case of gyrosocope 11 as M—N and P—Q in Fig. 1. So long as the system operates to maintain the vertical and horizontal north-south reference lines in their correct directions, torque axis M—N lies in the horizontal east-west direction, and torque axis P—Q is vertical. Three of these motors are shown in Fig. 1 at 40, 40' and 41'. The fourth motor 41 (Fig. 3) is not visible in Fig. 1, since it is so positioned that it is hidden by the rotor 1. Torque motor 40' for gyroscope 11 is located on the east-west axis M—N and serves to apply torques about the vertical torque axis P—Q. Similarly torque motor 41' is located on the vertical axis P—Q and serves to apply torques about the east-west torque axis M—N. Each torque motor comprises a permanent magnet core secured to the rotor case 2 (or 2') and a pair of energisable coils rigidly secured to the float chamber 3 or 3', so that on appropriate energisation of the coils torques are applied between the float chamber and the rotor case. Each permanent magnet core is generally H-shaped, in cross section, and is mounted, as can be seen in the case of core 47 in gyroscope 10, so that its plane of symmetry having this cross section lies in the radial plane containing the spin axis of the rotor and the torque axis on which it is located (that is, in the case of core 47, in the vertical east-west plane), the central link or yoke of the H section being directed outwards from the rotor axis, Each magnet core is so magnetised that both ends of one upright of the H section have one polarity and both ends of the other upright have the opposite polarity so that two air gaps are produced at the upper and lower ends of the H section in which the magnetic field runs in the same sense outwards from the rotor axis. The coils associated with the permanent magnets in each of the torque motor (40, 40', 41, 41') are of rigid construction.

The coils 71 and 72 of motor 40 in gyroscope 10 are visible in cross section in Fig. 1, but in the case of motors 40' and 41' in gyroscope 11 only one of the coils associated with each motor is visible, namely, coil 71' of motor 40' and coil 73' of motor 41'. As can be seen in the case of coils 71' and 73', the shape of the coils is generally rectangular, the two longer sides being substantially straight and parallel and the two shorter sides curved outwardly. One of the parallel sides of each coil lies in the gap between the pole faces of its associated permanent magnet, so that when the coil is energised a force is produced between the rotor case and the float chamber in a direction at right angles both to the direction of the magnetic flux between the pole faces of the magnet and to the direction of the current flowing through the portion of the coil that lies in the gap between these faces. The two coils of each torque motor are connected in series so that current flows in the same sense round both coils. Since the coils are disposed in parallel magnetic fields having the same sense the forces applied to the rotor case from the float chamber due to current in the two coils are additive. The resultant force operates to produce a torque on the gyroscope about one of the torque or precession axes through its centre of suspension and therefore to precess the gyroscope about the other torque or precession axis, namely that which passes through the motor. Torque motor 40', for instance, operates to precess the rotor and rotor case of gyroscope 11 about the east-west axis M—N.

The platform 7 is supported in an inner gimbal ring 8 for rotation about a first gimbal axis E—F which is parallel to the vertical reference line. The platform is mounted in bearings 81 and 82, the outer races of which are fixed in frameworks 83 and 83' which are formed as parts of the ring 8. The inner gimbal ring 8 is supported in an outer gimbal ring 9 (Fig. 2) for rotation about a second gimbal axis G—H which is located in the inner gimbal ring at right angles to the first gimbal axis E—F and which, therefore, in operation is horizontal. The outer gimbal ring 9 is supported in an outer framework 23 for rotation about the third gimbal axis J—K which is located in the outer gimbal ring at right angles to the second gimbal axis G—H. In this way the platform 7 has three degrees of freedom of angular movement with respect to the outer framework 23 which is all that is necessary to enable it to be maintained in fixed orientation, stabilised by the gyroscopes and by control actions exercised by the gyroscopes as hereinafter described, irrespective of angular motions of the outer framework 23. The outer framework 23 may therefore be fixed to a craft in which the gyroscopic system is to be used. Although other more elaborate mounting systems are possible it will be supposed that the framework 23 is fixed to the craft in such a manner that the axis J—K is parallel to the principal fore-and-aft or roll axis of the craft.

Electric currents are supplied to, and taken from, the various electrical devices mounted on the platform 7 through slip rings 84 and 85 rigidly fixed to the platform and brushes, two sets of which are shown at 86 and 87, mounted on the framework 83. Similar sets of slip rings and brushes (not shown) are provided for carrying the electric currents between the inner and outer gimbal rings 8 and 9 and between the outer gimbal ring 9 and the framework 23.

The function of the pick-off devices 5, 6, 5' and 6' will now be described in more detail with reference to Fig. 3 in addition to Figs. 1 and 2. The two pick-offs 5 and 6 mounted in gyroscope 10 detect angular displacement of the platform 7 from the position in which the rotor axis of gyroscope 10 is aligned with the vertical reference line. The pick-off shown at 6 provides an output $e_1$ that measures misalignment of the rotor axis and the vertical reference line in the east-west vertical plane containing the rotor axis. The second pick-off 5, which is not visible in the view of the apparatus shown in Fig. 1 but is illustrated schematically in Fig. 3, is mounted in such a position that it provides an output signal $e_2$ measuring misalignment of the same axis and the same line in the north-south vertical plane containing the rotor axis. The pick-off devices 5' and 6' in gyroscope 11 likewise provide signals $e_3$ and $e_4$ measuring misalignment between the rotor axis and the horizontal north-south reference line in two perpendicular planes, pick-off 5' providing a signal $e_3$ measuring misalignment in the north-south vertical plane and pick-off 6' providing a signal $e_4$ measuring misalignment in the horizontal or azimuth plane.

The signals $e_1$ and $e_2$ from the pick-offs in the gyroscope 10 are used to control servo motors 32 and 34 (Figs. 2 and 3) which operate to rotate the gimbal rings 8 and 9, so as to cause the platform 7 to assume and to maintain its correct operational position in the north-south and east-west vertical planes—namely that in which the vertical reference line and therefore the gimbal axis E—F, is parallel to the rotor axis of gyroscope 10. Since the framework 23 may assume any position in azimuth with respect to the platform 7, the signals $e_1$ and $e_2$ cannot be applied direct to the servo control systems 95 and 96 (Fig. 3) which control the servo motors 32 and 34 respectively. In order that the signals from each pick-off may be correctly apportioned between the two servo motors, they are fed to the servo systems operating them through a signal converter 20. This signal converter is of the component-mixer-and-resolver type and comprises a stator element 21 and a rotor element 22 in inductive relationship, the stator element 21 being fixed to the inner gimbal ring 8, and the rotor element 22 being fixed to the platform 7. Each element has two distributed windings whose magnetic axes are at right angles.

The signals from the pick-offs in gyroscope 10 are applied to the two windings of the rotor element so that they produce a resultant alternating magnetic field representing the misalignment vector, in that the angular position of the field in azimuth is determined by the direction in azimuth of the misalignment plane and its magnitude is proportional to the misalignment angle between the vertical reference line and the rotor axis. The two windings on the stator element 21 then measure the components of the misalignment vector in the plane of the gimbal ring 8 and in the vertical plane perpendicular thereto. These components are referred to herein as the transverse and fore-and-aft components of the misalignment vector respectively, and the outputs from the two windings of the stator element 21 are referred to as the transverse and fore-and aft misalignment signals. The values of these signals are respectively $e_1.\cos A + e_2.\sin A$ and $e_1 \sin A - e_2.\cos A$ where A is the azimuth angle between the two vertical planes containing the first gimbal axis E—F that are respectively parallel to the horizontal north-south reference line and normal to the second gimbal axis G—H. These misalignment signals $e_1.\cos A + E_2.\sin A$ and $e_1.\sin A - e_2.\cos A$ are applied as error signals to serve control systems 95 and 96 which control the servo-motors 32 and 34. Servo-motor 32 is mounted on a platform 33 which is formed as a continuation of a web on one of the uprights of platform 23. The driving pinion 36 of this motor meshes with a gear wheel 37 fastened to a boss formed on the outer gimbal ring 9 by means of screws, one of which is shown at 38. Servo control system 95 operates motor 32 to rotate gimbal ring 9 about the third gimbal axis J—K in the sense to reduce the transverse misalignment signal $e_1.\cos A + e_2.\sin A$ towards zero. Servo-motor 34 is mounted on a platform 35 which is integral with the outer gimbal ring 9. The driving pinion 39 of this motor meshes with a gear wheel 43 fastened to a boss formed on the inner gimbal ring 8 by means of screws, two of which are shown at 44 and 44'. Servo control system 96 operates motor 34 to rotate gimbal ring 8 about the second gimbal axis G—H in the sense necessary to reduce the fore-and-aft misalignment signal $e_1.\sin A - e_2.\cos A$ towards zero.

The two servo control systems 95 and 96 may be of any known kind provided that they are accurate and fast acting and include provisions for damping oscillations.

In operation the two servo systems co-operate to turn the first gimbal axis E—F in the vertical plane containing it and the second gimbal axis G—H is the vertical plane containing it and the third gimbal axis J—K respectively, until a rest position is attained in which both the error signals are zero. Since the first gimbal axis E—F is parallel to the vertical reference line in the gyroscope 10 it follows that this rest position is attained when the axis E—F is parallel to the axis of the rotor 1 in gyroscope 10. Thus the axis E—F is stabilised to be set substantially vertical. Control systems 95 and 96, however, do not determine in any way the angular position of the platform in azimuth about the axis E—F. The azimuth position of the platform is determined by a third servo system 97 to which the azimuth misalignment signal $e_4$ is applied as an error signal. Servo system 97 operates to control the azimuth servo motor 30 which is mounted on the platform 7. The driving pinion 31 of this motor meshes with a gear ring 29 which is fastened by means of screws, one of which is shown at 28, to a horizontal ring 27 formed integrally with the vertical inner gimbal ring 8. This third servo system is arranged to operate the motor 30 so that it turns the platform 7 about the axis E—F with respect to the gimbal ring 8 until the horizontal north-south reference line is in line with the rotor axis of gyroscope 11 in the horizotnal plane. This position is indicated by reduction of the azimuth-misalignment signal $e_4$ to zero. Thus platform 7 is stabilised so that the horizontal north-south reference line is actually maintained horizontal and in the north-south direction to the extent that the rotor axis of gyroscope 11 is maintained truly horizontal and in the north-south direction. The output signal $e_3$ from pick-off 5' in gyroscope 11, which, as stated above, is a measure of misalignment between the rotor axis of gyroscope 11 and the horizontal north-south reference line in the north-south vertical plane, is applied as an input to a control system 98 which operates the torque motor 40'. As explained above, torque motor 40' operates to precess the rotor and rotor case of gyroscope 11 about the axis M—N. The control system 98 is arranged so that this precession is in such a sense as to reduce misalignment between the rotor axis and the reference line until the output signal $e_3$ is reduced to zero. In this manner the rotor axis of gyroscope 11 is maintained horizontal to the extent that the rotor axis of gyroscope 10 is maintained truly vertical.

On the platform 7 two accelerometers 45 and 46 are mounted so as to be responsive to horizontal accelerations in the north-south and east-west directions respectively. These accelerometers are substantially of the kind described and claimed in my co-pending application S.N. 151,068, filed March 22, 1951 jointly with M. L. Jofeh and R. Albrecht, and in my copending application S.N. 220,196, filed April 11, 1951 which are designed to provide output signals very accurately proportional to whatever acceleration acts along the axis of response of the accelerometer. A third accelerometer 91 (not shown in Figs.

1 and 2) but of similar construction may also be mounted on the platform to be responsive to vertical accelerations.

On the assumption that the apparatus operates as intended to maintain the platform 7 in such a position that the vertical reference line is truly vertical and the horizontal north-south reference line is truly horizontal and in the north-south direction, it can be said that the two accelerometers 45 and 46 provide measures of the north-south and east-west horizontal components of the acceleration of the craft.

In Fig. 3 of the drawings the stabilised platform according to the present invention is shown as used in a navigational system as described and claimed in my co-pending application No. 215,221 filed March 13, 1951. Navigational systems of this kind are designed to compute the instantaneous position of a moving craft by doubly integrating measurements of acceleration effected on the craft. It is assumed that it is required to obtain the position of the craft as specified in the earth's latitude and longitude co-ordinate system, i.e. in terms of $r$ the radial distance of the craft from the earth's centre, $\Phi$ the longitude of the craft and $\theta$ its latitude.

For this purpose three accelerometers 91, 45 and 46 are shown as being mounted on a stabilised platform to provide measurements of the acceleration of the craft in three mutually perpendicular directions, namely $\alpha_1$ vertically upwards, $\alpha_2$ horizontally to the east and $\alpha_3$ horizontally to the north. If desired the accelerometer 91 may be replaced by a barometric or similar device which is capable of providing a measure of the height of the craft above the earth and apparatus for computing therefrom measures of the velocity and the acceleration of the craft in the vertical direction. These measures of the accelerations are applied to a computer 100 (see Figs. 4 and 5) which computes from them, in combination with the gyroscopes the height, the latitude and the longitude of the craft, and as a step toward doing so it computes by integrating the respective accelerations the velocities $v_1$, $v_2$ and $v_3$ directed respectively vertically upwards, horizontally to the east and horizontally to the north.

As will be hereinafter described, the computer 100 is designed to take account of the fact that the accelerometers 91, 45 and 46 measure accelerations in directions, viz, vertically upwards, horizontally to the east and horizontally to the north, that are continuously changing relative to space, or to stellar axes, partly owing to the travel of the craft over the earth's surface and partly owing to rotation of the earth about its axis, and that the velocities $v_1$, $v_2$ and $v_3$ computed from these accelerations are likewise measured in the same continually changing directions. In other words, the computer takes account of the fact that the accelerations and velocities with which it deals are velocities and accelerations in rotating axes, the axes being the local vertical, the local horizontal easterly direction and the local horizontal northerly direction. It takes account of this fact by computing velocity components from the measured acceleration components according to the formulae for rotating axes, viz.

$$\dot{v}_1 = \alpha_1 - \omega_2 v_3 + \omega_3 v_2$$
$$\dot{v}_2 = \alpha_2 - \omega_3 v_1 + \omega_1 v_3 \quad (A)$$
$$\dot{v}_3 = \alpha_3 - \omega_1 v_2 + \omega_2 v_1$$

where $\omega_1$, $\omega_2$ and $\omega_3$ are the component angular velocities or spins of the local co-ordinate axes about their own directions due to travel of the craft. In producing the necessary modifying quantities for deriving the quantities $\dot{v}_1$, $\dot{v}_2$ and $\dot{v}_3$ from the accelerations $\alpha_1$, $\alpha_2$ and $\alpha_3$, the computer 100 also derives quantities measuring the spin components $\omega_1$, $\omega_2$ and $\omega_3$.

In the case of the co-ordinate system considered, the velocity and spin components may be expressed in terms of the co-ordinates $r$, $\Phi$ and $\phi$ and the angular velocity $\Omega$ of the earth about its axis by the following equations:

$$v_1 = \dot{r}$$
$$v_2 = r(\dot{\Phi} + \Omega) \cos \theta \quad (B)$$
$$v_3 = r\dot{\theta}$$
$$\omega_1 = (\dot{\Phi} + \Omega) \sin \theta$$
$$\omega_2 = (\dot{\Phi} + \Omega) \cos \theta \quad (C)$$
$$\omega_3 = -\dot{\theta}$$

Thus the measures of the acceleration components $\alpha_1$, $\alpha_2$ and $\alpha_3$ are modified in the computer by the addition of rotated-velocity components in order to convert them into measures $\dot{v}_1$, $\dot{v}_2$ and $\dot{v}_3$ of the rate of change of the corresponding velocity components. These measures are then integrated to provide computed values $v_1$, $v_2$ and $v_3$ for these velocity components. This modification of the measures of the acceleration components is carried out by applying forces to the accelerometers proportional to the modifying terms whereby the accelerometer outputs of Fig. 4 are $\alpha'_1$, $\alpha'_2$, $\alpha'_3$. The above is accomplished in a manner shown in Figs. 4 and 5 of the present case, one suitable form of accelerometer capable of such modification being described and claimed in co-pending application No. 220,496.

The structural details of the computer 100 which computes the angular velocity components $\omega_1$, $\omega_2$, and $\omega_3$ and provides the integrals $v_1$, $v_2$, and $v_3$ of the respective craft accelerations $\alpha_1$, $\alpha_2$, and $\alpha_3$ are shown in Figs. 4 and 5.

The accelerometers 91, 45 and 46 are each subjected to the action of two modifying quantities derived in a manner that will be explained in more detail hereinafter so that their outputs are not measures of the acceleration components $\alpha_1$, $\alpha_2$, $\alpha_3$, but of the modified acceleration quantities $\alpha_1$, $\alpha_2$, $\alpha_3$. The modifying quantities applied to modify the outputs of the several accelerometers are intended to be respectively proportional to:

Accelerometer 91, $-\omega_2 v_3 + \omega_3 v_2$
Accelerometer 45, $-\omega_3 v_1 + \omega_1 v_3$
Accelerometer 46, $-\omega_1 v_2 + \omega_2 v_1$ so that $\alpha'_1$, $\alpha'_2$, $\alpha'_3$ should be obtained substantially in accordance with the equations.

$$\alpha'_1 = \alpha_1 - \omega_2 v_3 + \omega_3 v_2$$
$$\alpha'_2 = \alpha_2 - \omega_3 v_1 + \omega_1 v_3$$
$$\alpha'_3 = \alpha_3 - \omega_1 v_2 + \omega_2 v_1$$

which, by equations A makes $\alpha'_1$, $\alpha'_2$, $\alpha'_3$ substantially equal to $\dot{v}_1$, $\dot{v}_2$, $\dot{v}_3$. The modified quantities $\alpha'_1 = \dot{v}_1$, $\alpha'_2 = \dot{v}_2$ and $\alpha'_3 = \dot{v}_3$ are applied respectively to integrating devices 131, 231 and 331. It follows that, if the integrating devices operate to give outputs substantially proportional to $\int \alpha'_1 dt$, $\int \alpha'_2 dt$, $\int \alpha'_3 dt$, these outputs these outputs will be substantially proportional to $v_1$, $v_2$, $v_3$.

As pointed out above, in the case of the main co-ordinate system considered, these velocities would be the component velocities of the craft in the directions of the local co-ordinate axes, i.e. upwards, horizontally to the east, and horizontally to the north respectively, relative to a point fixed in space at the instantaneous position of the craft. These velocities may be expressed in terms of the coordinates $r$, $\phi$, $\theta$ and of the angular velocity $\Omega$ of the earth about its axes by the equations B above.

The modified acceleration quantities $\alpha'_1$, $\alpha'_2$, $\alpha'_3$ are obtained from the outputs of the accelerometers 91, 45, 46, as D.C. voltages. These voltages are applied to the input circuits of integrating amplifiers in the form of high-gain D.C. amplifiers 131, 231, 331, provided with negative capacitive feed-back. Such amplifiers are now well-known but the accuracy of the present system is best maintained if the amplifiers are compensated against the occurrence of drift effects, e.g. in the manner disclosed in my co-pending U.S. patent application No. 130,328 filed November 30, 1949 jointly with F. A. Summerlin.

The three quantities measuring respectively $v_1$, $v_2$ and $v_3$ are fed into the computer 150 in which the co-ordinates $r$, $\phi$ and $\theta$ are derived from the measures of the component velocities. It is clear that the first co-ordinate $r$ may be derived from the first component velocity $v_1$ by directly integrating it. In the particular case, if it is desired that the indicator 151 should show the height of the craft above the earth's surface rather than the radius from the center of the earth to the craft, it is necessary to set the indicator 151 initially so that it reads the height of the craft at the time at which the apparatus is set in motion. Similarly $\phi$ and $\theta$ may be derived from $v_2$ and $v_3$ respectively by integration. However, before integrating $v_2$ and $v_3$ it is necessary to apply correcting factors $r \cos \theta$ and $r$ in order that the integrators should compute $\int (v_2/r \cos)dt$ and $$\int (v_3/r)dt$$

respectively instead of $\int v_2 dt$ and $\int v_3 dt$. Further in the particular case, since indicator 152 will be required to measure the longitude of the position of the craft, the quantity $v_2$ before being integrated must first be modified to allow for the presence of the term $r.\cos \theta.\Omega$ in the input, since the indication required is relative to the earth. However, the quantity $v_2$ which is fed back to the correcting devices in accelerometers 91 and 46 must be as defined above, i.e. in the east-west direction relative to a point fixed in space at the instantaneous position of the craft. Therefore arrangements must be provided for feeding this quantity directly from the output of integrator 231 back to the accelerometers.

In addition to deriving the co-ordinates $r$, $\phi$ and $\theta$ and, where necessary, modifying the input velocity quantities so as to provide output velocity quantities equal to $v_1$, $v_2$ and $v_3$, computer 150 is also designed to derive quantities measuring the spin components $\omega_1$, $\omega_2$ and $\omega_3$, which are the component angular velocities of the local co-ordinate axes about their own respective directions due to travel of the craft. In the particular case the spin components $\omega_1$, $\omega_2$ and $\omega_3$ may be express in terms of the co-ordinates $r$, $\phi$ and $\theta$ by the equations C above.

In Fig. 5 there is shown a schematic diagram of one form of computer 150 suitable for use in the system shown in Figs. 3 and 4. This computer is intended for the particular case described above in which the quantities fed in are $v_1$, $v_2$ and $v_3$. It provides indications of the three co-ordinates of the craft's position in the main co-ordinate system $r$ (or preferably, as shown, $r-R$, when R is the radius of the earth and consequently $r-R$ is the height of the craft) $\phi$ and $\theta$, and derives the three spin components $\omega_1$, $\omega_2$, $\omega_3$ for application to the gyro torquers 41', 41 and 40 respectively.

The quantity representing the velocity $v_1$, which may be in the form of the rotation of a shaft or in the form of an electrical voltage or current, is fed to an integrating device 141. The output of this device, which again may be in the form of an electrical voltage or current or the rotation of a shaft, is fed to a computing device 150' into which is also fed a constant R representing the radius of the earth. This computing device 150' operates to provide an output $r-R$ which indicates the height of the craft above the earth's surface. This output is arranged to operate indicator 151. The output of the integrator 141 which measures $r$ is also used to operate correcting devices in integrating devices 241 and 341. In addition, the quantity $v_1$ is taken directly from the input to be fed back to accelerometers 45 and 46.

The quantity proportional to $r \bar{\theta}$ from integrator 331 is fed to an integrating device 341 (Fig. 4) which, instead of integrating this quantity directly, utilizes the output, $r$, of device 141 to modify the operation of the integrator so that in effect it integrates $\bar{\theta}$ to produce an output giving an indication of the latitude $\theta$ of the craft. This output may conveniently be in the form of the rotation of a shaft which operates indicator 153 and is also utilized to operate correcting devices in integrating device 241. The integrating device 341 in addition to producing an output proportional to the integral of $\bar{\theta}$, produces a further output quantity proportional to $-\bar{\theta}$ which is used as the output quantity measuring $\omega_3$ for application to the gyro torquer 40. In addition the output measuring $v_3$ for accelerometers 91 and 45 is derived directly from the input.

The quantity proportional to $r.\cos \theta \; (\bar{\phi}+\Omega)$ from integrator 231 is fed to an integrating device 241, the operation of which is described in more detail hereinafter with reference to Fig. 5. In this device the input quantity measuring $r.\cos \theta \; (\bar{\phi}+\Omega)$ is first fed to a computer 244 which operates to provide an output quantity measuring $r.\cos \theta.\bar{\phi}$. To do this computer 244 utilizes the output measuring $r$ from integrating device 141 and also the output measuring $\cos \theta.\Omega$ from a computer 272 controlled by a quantity proportional to $\theta$ provided by integrator 341. The output of computer 244, providing a measure of $r.\cos \theta.\bar{\phi}$, is fed to an integrator 243 which includes a correcting device designed to utilize the output measuring $r$ from integrating device 141 and the output measuring $\cos \theta$ from computer 271 to make it integrate in effect $\bar{\phi}$ instead of $r.\cos \theta.\bar{\phi}$ and thus to produce an output proportional to the longitude angle $\phi$. This output operates the indicator 152 which may initially be set to the initial longitude angle of the craft and will thereafter indicate any change of that angle. In addition to providing an output proportional to the integral of $\bar{\phi}$, integrator 243 through the operation of its correcting device also provides an output proportional to $-\bar{\phi}$. The quantity proportional to $-\bar{\phi}$ is fed as an input to a computer 245 which operates firstly to multiply this quantity by a quantity measuring $\sin \theta$ derived in computer 271 and to add the resulting quantity measuring $\sin \theta.\bar{\phi}$ to a quantity representing $\sin \theta.\Omega$ derived in computer 272, thus producing an output measuring $\sin \theta(\bar{\phi}+\Omega)$. It will be seen from equation C that this is the value of $\omega_1$ which is required for application to the gyro torquer 41'. Computer 245 operates secondly to multiply the input quantity proportional to $\bar{\phi}$ by a quantity measuring $\cos \theta$ derived in computer 271 and to add the resulting quantity measuring $\cos \theta.\bar{\phi}$ to a quantity representing $\cos \theta.\Omega$ derived in computer 272, thus producing an output measuring $\cos \theta(\bar{\phi}+\Omega)$. As will be seen from equations C, this is the value of $\omega_2$ which is to be fed to the gyro torquer 41.

A preferred form of the integrating device 241 (Fig. 4) is shown in Fig. 5. The principle of operation of integrating devices 141 and 341 is similar, but the devices are simpler than device 241, since as has been stated, the operation of the integrating device 241 has to be corrected by two correcting factors proportional to $r$ and to $\cos \theta$ respectively, whereas, in the case of device 141, no correction is required, and in the case of device 341 only one correcting factor, $r$, is required.

A voltage representing $v_2$ which equals $r.\cos \theta(\bar{\phi}+\Omega)$ is fed from the output of integrating devices 231 to terminals 240 and thence to computer 244 in which it is applied to the input terminals of a linear D.C. amplifier 267. Across the output terminals of this amplifier are connected a high-resistance resistor 264 and a low-resistance resistor 261 in series. A quantity representing the constant $\Omega$ (the angular velocity of the earth about its polar axis) is fed to a potentiometer 260 which is controlled by a shaft coupled to the motor that operates indicator 153 and whose rotation is proportional to $\theta$. Potentiometer 260 is of special construction being designed so that the voltage on its slider is proportional to the input voltage multiplied by the angle represented by the rotation of its control shaft. The voltage on the slider of this potentiometer, which will be proportional to $\cos \theta . \Omega$, is fed to a further potentiometer 262 which is controlled by a shaft coupled to the motor that is driven by the output of integrating device 141 and whose rotation is proportional to $r$. Potentiometer 262 is constructed so that the voltage on its slider is a linear function of the angle turned through by its control shaft. The voltage on the slider of this potentiometer is thus proportional to $r . \cos \theta . \Omega$. This voltage is fed to the input terminals of amplifier 269 which operates to produce at its output terminals a voltage which is proportional to $-r . \cos \theta . \Omega$. Across these output terminals are connected high-resistance resistor 263 and low-resistance resistor 261 in series. Thus the current through resistor 261, and consequently the voltage across it, is substantially proportional to the sum of the output voltage of amplifiers 267 and 269 and consequently to $r . \cos \theta . \dot{\phi}$.

The voltage across resistor 261 is fed through resistor 242 to the input terminals of D.C. amplifier 270. This is a high-gain amplifier with negative feed-back and is preferably compensated for drift effects in the manner disclosed in co-pending U.S. application 130,328. Whatever type of amplifier is used its input impedance must be kept low so that it may be used as a D.C. mixer amplifier. The output of the amplifier 270 is applied to a motor 246, which it drives at a speed dependent on the total input voltage to the amplifier. Motor 246 drives a D.C. generator 247 which produces a voltage proportional to the speed of the motor. A fraction of this voltage is fed back to the input terminals of the amplifier 270 in such a sense as to oppose the input voltage measuring $r . \cos \theta . \dot{\phi}$. The fraction of the generator voltage that is fed back is determined by the settings of two potentiometers 249 and 250 which are controlled by shafts coupled to the motors that operate indicators 151 and 153 respectively, and whose rotations are proportional to $r$ and to $\theta$ respectively. Potentiometer 249 is of similar construction to potentiometer 260 described above being designed so that its output voltage is proportional to the input voltage multiplied by the cosine of the angle represented by the rotation of its control shaft. Thus, the feed-back voltage is proportional to the product of the speed of the generator 247, of $r$, and of $\cos \theta$. Since the feed-back amplifier 270 operates substantially to equate the input voltage which is proportional to $r \dot{\phi} \cos \theta$ and the feed-back voltage, it follows that the speed of generator 247 is maintained substantially proportional to $\dot{\phi}$. A shaft 248 is also coupled to motor 246 so that its speed is therefore also proportional to $\dot{\phi}$ and consequently the angle through which it rotates is proportional to $\phi$. This shaft drives indicator 152. Consequently, if this indicator is initially set to the initial longitude angle of the craft when the apparatus is set in motion, it will continue subsequently to show the correct longitude $\phi$ of the craft during operation of the system.

As explained with reference to Fig. 4, integrator 241 operates to produce two further outputs, viz. $\omega_1$ and $\omega_2$, which are respectively equal to $\sin \theta (\dot{\phi}-\Omega)$ and to $\cos \theta (\dot{\phi}+\Omega)$. In order to produce the quantity measuring $\omega_1$, a voltage representative of the quantity $-\sin \theta . \dot{\phi}$ is obtained from the output of generator 247 by means of a potentiometer 251. This potentiometer is of special construction and is designed to produce an output voltage proportional to the sine of an angle represented by the rotation of its control shaft multiplied by its input voltage. The control shaft of the potentiometer 251 is driven by the shaft that operates indicator 53 so that its displacement is proportional to the latitude angle $\theta$. Thus, as the output of generator 247 is proportional to $-\dot{\phi}$, the voltage on the slider of potentiometer 251 is proportional to $-\sin \theta . \dot{\phi}$. This voltage is applied to the input terminals of a linear D.C. amplifier 253, the output of which is of opposite sense to its input, so that a quantity proportional to $\sin \theta . \dot{\phi}$ is fed through resistor 254 to terminals 265. The voltage representing $\Omega$ from source 266 is applied in computer 272 to a potentiometer 255, similar to potentiometer 251 in computer 271, and having its control shaft operated in the same way from the output of integrator 341, so that the voltage on its slider is proportional to $\sin \theta . \Omega$. This voltage is fed to terminals 265 through resistor 255 so that the current flowing through the low impedance gyro torquer 41' will be substantially proportional to $\sin \theta . (\dot{\phi}+\Omega)$.

To produce the quantity $\omega_2$, which is equal to $\cos \theta (\dot{\phi}+\Omega)$, the voltage of the slider of potentiometer 249, which is proportional to $-\cos \theta . \dot{\phi}$, as explained above, is fed to the input terminals of linear D.C. amplifier 257. The output of this amplifier is of opposite sense to its input so that a voltage proportional to $\cos \theta . \dot{\phi}$ is fed to terminals 266 through resistor 258. The voltage on the slider of potentiometer 260, which is proportional to $\cos \theta . \Omega$, is also fed to terminals 266 through a resistor 259, so that the current flowing through the gyro torquer 41 is substantially proportional to $\cos \theta (\dot{\phi}+\Omega)$.

Thus in the system of the present invention, currents proportional to the computed angular velocity components $\omega_1$, $\omega_2$ and $\omega_3$ are utilised to maintain the stabilised platform in the correct relation to the local system of co-ordinate axes in spite of movements of the craft over the earth's surface and the rotation of the earth. To this end a current proportional to the spin component $\omega_1$ is fed to the torque motor 41' in gyroscope 11 to cause precession of that gyroscope in the horizontal plane at an angular velocity equal to $\omega_1$; a current proportional to $\omega_2$ is fed to torque motor 41 in gyroscope 10 to cause precession of that gyroscope in the east-west vertical plane at an angular velocity equal to $\omega_2$; and a current proportional to $\omega_3$ is fed to torque motor 40 in gyroscope 10 to cause precession of that gyroscope in the north-south vertical plane at a velocity equal to $\omega_3$.

On the assumption that the platform is correctly stabilised and oriented at an initial instant, that the outputs of the accelerometers 91, 45 and 46 are accurate measures of the components of the acceleration of the craft along the three local co-ordinate axes and that the computer 100 computes accurately according to the formulae above, the computed values $\omega_1$, $\omega_2$ and $\omega_3$ for the angular velocity components of the co-ordinate axes and are just the rates at which the rotor axes of the gyroscopes 10 and 11 should be precessed to keep them parallel to the local co-ordinate axes. On the assumption that the torque motors 41', 41 and 40 operate accurately, the gyroscopes 10 and 11 are precessed at just these correct rates and, therefore, continue to define the true local vertical and the true north direction as the craft travels over the earth's surface.

It is clear, therefore, that the whole system shown in Fig. 3 is a closed-circuit control system comprising a number of closed-circuit control sub-systems as parts of it. It follows that, if all the parts operate accurately, it is capable of having, as a steady state solution of its equations of motion, one in which the gyroscopes 10 and 11 accurately maintain the local vertical and horizontal true north directions respectively. Consequently, if the gyroscopes 10 and 11 are initially set correctly and if no continuous disturbing cause is operating, such as a torque liable to precess one of the gyroscopes, or a systematic error in the operation of a part of the system, the gyroscopes 10 and 11 will continue to maintain the local vertical and local true north directions. If there is a small initial error in setting the gyroscopes the system will execute slow oscillations with a period of 84 minutes about the steady state condition, so that the directions of the axes of the gyroscopes 10 and 11 will oscillate at this period about the local vertical and the local meridian. If, on the other hand, a disturbing cause is operating, liable by itself to cause the gyroscopes to wander if the circuit of the complete closed-loop control system is broken, then on completion of the system into a closed loop the oscillation will again develop, even if the initial setting is correct, with such an amplitude that the rate of maximum precession of the gyroscope is equal to the initial wander-rate.

Any known means may be used for initially setting the system, either on land before the start of the craft's journey, or optically by comparison with astronomical references so that the gyroscope axes are respectively very accurately vertical and in the direction of true north, and such means do not form, per se, a part of the present invention.

Oscillations due to initial wander-rate can also be rendered very small by modern, known techniques. The gyroscopes, for example, described in co-pending application No. 147,444 have a very low wander-rate. Similarly, systematic errors in the operation of the system are reduced by use of the highly accurate accelerometers described in the aforesaid co-pending application 151,068. Similarly, the follow-up servo systems and the computer may be so designed as to be highly accurate.

What is claimed is:

1. In a gyroscopic horizon for moving vehicles, a universally gimballed platform, a casing journalled on said platform with freedom about the vertical axis, a gyro vertical journalled therein for spinning about a vertical axis with freedom about two horizontal axes and a vertical axis and having accelerometers thereon adapted to be stabilized thereby and to generate signals proportional to accelerations in two directions in azimuth, a directional gyro also mounted in said casing for spinning about a horizontal axis with freedom about at least one horizontal axis, a servomotor controlled by said directional gyro for fixing said casing and said accelerometers in azimuth, servomotors for stabilizing said casing and accelerometer from said gyro vertical, torquers acting between said casing and gyro vertical and controlled by said accelerometers for applying torques on the gyro vertical about its two horizontal axes normal to the direction of response of its accelerometer, integrating networks between said accelerometers and torquers whereby the resulting precession of the gyro is equal to the change in the vertical due to the change in geographic position of the vehicle, a third accelerometer thereon adapted to generate signals proportional to accelerations in the vertical direction, a torquer controlled thereby for applying a torque on said directional gyro and an integrating network between said accelerometer signal and torquer whereby the resulting precession of the directional gyro is varied with the change in altitude of the craft.

2. In a gyroscopic artificial horizon for moving vehicles, a gyroscope, an inner gimbal mounting for supporting said gyroscope with freedom about two mutually perpendicular horizontal axes, an enclosure containing a liquid in which said gyroscope and inner gimbal mounting are totally immersed for substantially eliminating the load of said gyroscope and gimbal on their support bearings, control torquers carried by said enclosure for applying torques on the gyro about selected horizontal axes of said gimbal mounting, an outer gimbal mounting for universally supporting said enclosure, accelerometer devices carried by said enclosure and adapted to generate signals proportional to accelerations of said vehicle along two mutually perpendicular horizontal directions, integrating networks between said accelerometers and said torquers for producing a precession of said gyroscope in proportion to the magnitude and direction of change in the geographic position of said vehicle, and follow-up servomotors coupled with said gimballed enclosure and controlled by said gyro for stabilizing said enclosure from said gyroscope.

3. In a gyroscopic artificial horizon, a pair of gyroscopes, one having a normally horizontal and the other a normally vertical axis and each having a substantially closed rotor casing, an outer enclosure therefor, means gimballing each casing in said enclosure for freedom about two axes, a liquid between each casing and said enclosure in which said casing is immersed and which virtually supports the weight of the gimballing means and said casing, means mounting said enclosure for freedom about all three primary axes, and power means for stabilizing said enclosure in its mounting from said gyroscopes about all three axes.

4. A gyroscopic artificial horizon as claimed in claim 3 in which said liquid is mercury and the rotor and its casing are made of a metal having a greater specific gravity than mercury.

5. A velocity-precessed gyroscopic system comprising a universally gimballed support, a second support mounted within said first support for freedom about a vertical axis therein, a gyro vertical universally gimballed in said second support, a second gyroscope of the directional type mounted for freedom about a vertical axis in said second support, means for fixing in azimuth said second support and said gyro vertical from said directional gyro, servo means for stabilizing said first support horizontally from said vertical gyro, two accelerometers on said second support for measuring component accelerations in E—W and N—S directions, integrators for the outputs of said accelerometers for producing signals proportional to the craft's velocity in the aforesaid directions, and torque applying devices controlled by said accelerometers for precessing the gyro vertical about its horizontal axis to maintain the system truly vertical in its gimbal support.

6. A velocity-precessed gyroscopic system as claimed in claim 5, having a third accelerometer mounted to measure vertical acceleration of the craft and a third torque controlled thereby, said accelerometer being also mounted on said second support, and wherein said integrators also compensate for the rotation of the earth whereby corrections for the change in the local vertical caused by the rotation of the earth are also obtained.

7. A velocity precessed gyroscopic system comprising a universally gimballed support, a frame mounted therein for freedom about a vertical axis, a gyro vertical universally mounted in said frame, a directional gyroscope also journalled in said frame for freedom about a vertical and horizontal axis, pick-offs on the directional gyroscope and gyro vertical for stabilizing said frame in azimuth and about both horizontal axes, two accelerometers mounted to be stabilized in azimuth and horizontally by said gyroscopes and measuring accelerations of the craft in E—W and N—S directions, two torque applying devices controlled by said accelerometers, and integrators between the said accelerometers and torque applying devices to precess the gyro vertical in two planes, to maintain the system truly vertical in its gimbal support.

8. The gyroscopic system as claimed in claim 2 wherein a further accelerometer device is carried by said enclosure and adapted to generate a signal proportional to accelerations of said vehicle in a vertical direction, and means for supplying said vertical acceleration signal to said integrating networks for modifying the precession of said gyroscope produced thereby.

9. A gyroscopic system as claimed in claim 5 in which the means for fixing in azimuth said second support and said gyro vertical from said directional gyroscope comprises a torque applying device for precessing said directional gyro in a horizontal plane, means responsive at least in part to said velocity signals for providing a signal proportional to angular velocity of said craft about a radius vector from the earth's center to the craft position, and means for supplying said last-mentioned signal to said directional gyro torque applying device.

References Cited in the file of this patent

UNITED STATES PATENTS

| | | |
|---|---|---|
| 1,480,637 | Schuler | Jan. 15, 1924 |
| 1,501,886 | Abbot | July 15, 1924 |
| 1,743,533 | Davis | Jan. 14, 1930 |
| 1,950,517 | Rawlings | Mar. 13, 1934 |
| 2,208,207 | Boykow | July 16, 1940 |
| 2,411,087 | Ford et al. | Nov. 12, 1946 |
| 2,462,081 | Esual | Feb. 22, 1949 |
| 2,517,612 | Varian | Aug. 8, 1950 |
| 2,573,626 | Taylor | Oct. 30, 1951 |
| 2,598,672 | Braddon | June 3, 1952 |